United States Patent [19]

Huber et al.

[11] 4,241,945
[45] Dec. 30, 1980

[54] MOTOR VEHICLE BUMPER

[75] Inventors: Guntram Huber, Aidlingen; Wolfgang Klie, Korntal; Wolfgang Fischer, Echterdingen; Daniel Riechers, Sindelfingen; Hubert Hutai, Grafenau, all of Fed. Rep. of Germany

[73] Assignee: Daimler-Benz Aktiengesellschaft, Fed. Rep. of Germany

[21] Appl. No.: 966,865

[22] Filed: Dec. 6, 1978

[30] Foreign Application Priority Data

Dec. 9, 1977 [DE] Fed. Rep. of Germany ....... 2754868

[51] Int. Cl.³ .............................................. B60R 19/00
[52] U.S. Cl. ................................... 293/120; 293/133; 293/136
[58] Field of Search ................ 293/120, 132, 133, 136

[56] References Cited

U.S. PATENT DOCUMENTS 4,171,143 10/1979 Huber .................................. 293/120

Primary Examiner—John J. Love
Assistant Examiner—John A. Carroll
Attorney, Agent, or Firm—Craig & Antonelli

[57] ABSTRACT

A motor vehicle bumper consisting of an approximately U-shaped relatively elastic base body, of an apron made of elastic plastic material which covers the forwardly disposed web of the base body and is drawn around up to the flanges adjoining the web on both sides, and of a cover constructed as decorative strip and covering at least the remaining visible part of the upwardly disposed flange; the cover is thereby pivotally connected with the base body exclusively by fastening elements disposed substantially in the axial direction of the two bumper supports while the upper flange is surrounded at the end face by clamps formed out of the cover within the area of the bumper supports and possibly also within areas displaced outwardly with respect thereto.

12 Claims, 5 Drawing Figures

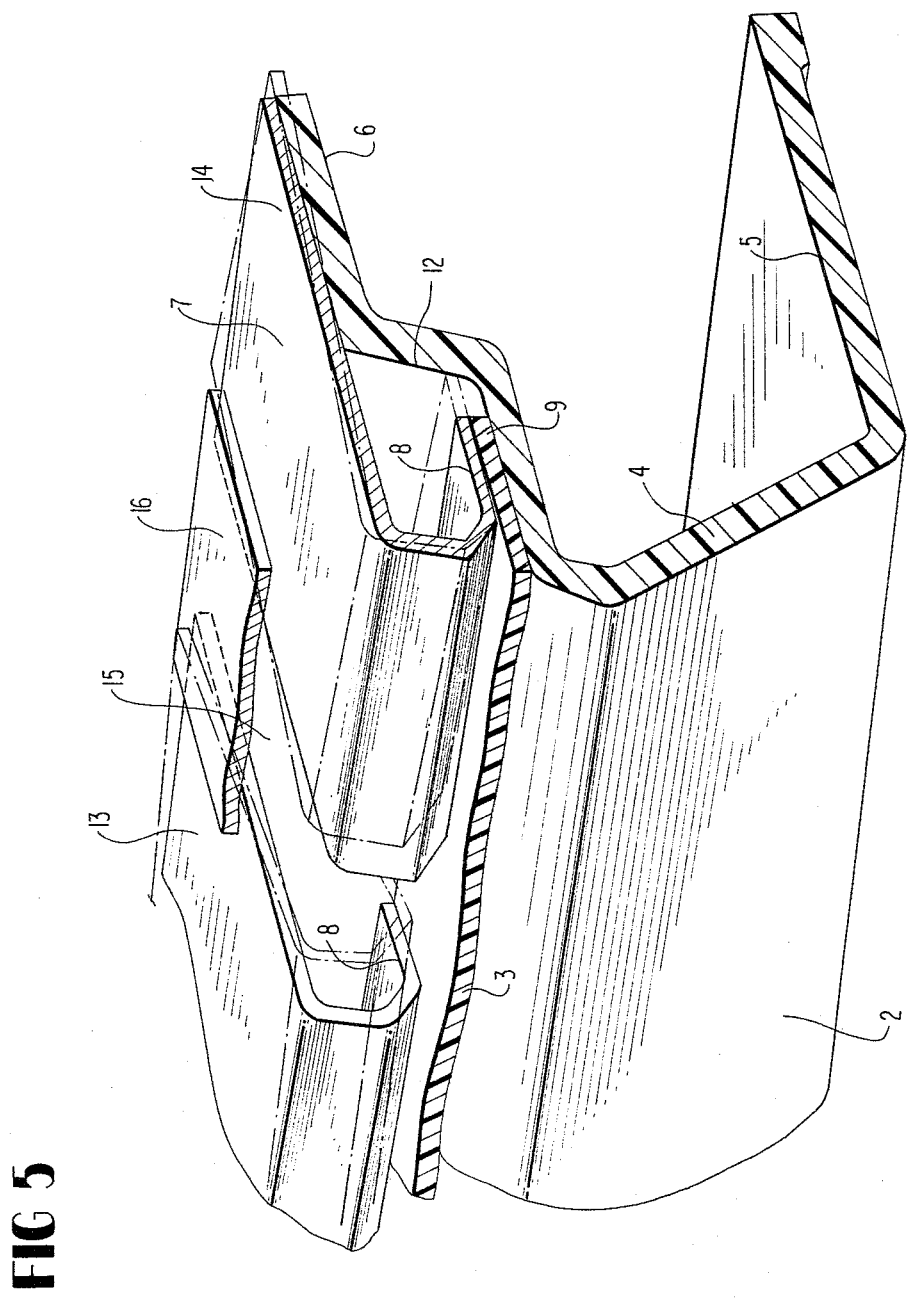

MOTOR VEHICLE BUMPER

The present invention relates to a motor vehicle bumper consisting of a relatively elastic base body approximately U-shaped in cross section, especially of a glass fiber reinforced synthetic resinuous material, further consisting of an apron formed of elastic synthetic plastic material which covers off the forwardly disposed web of the base member and which is drawn about up to the flanges adjoining the web on both sides, and finally consisting of a cover constructed as decorative strip which covers off at least the remaining visible part of the upwardly disposed flange.

Such a bumper is described in the German Offenlegungsschrift 24 60 859, whereby the cover, on the one hand, is suspended from a bar projecting forwardly from the base body and on the other hand, is supported with prestress at a bulge projecting end face from the base body. Since a bending of the base body cannot be prevented especially with a local impingement or impact of the bumper outside of the force introduction place against an obstacle, the clamped-in cover is also affected thereby and likely to be damaged therewith. It may thereby lead to a folding of the cover which is no longer regenerable, whereas the base body frequently returns automatically to its normal installed position.

It is the aim of the present invention to so arrange the cover that the latter is not negatively influenced upon impact of the bumper against an obstacle by the bending movement of the base body.

Consequently, a motor vehicle bumper of the aforementioned type is proposed, whereby according to the present invention the cover is pivotally connected with the base body exclusively by fastening elements disposed in the axial direction of the two bumper supports, and whereby within the area of the bumper supports and possibly displaced outwardly thereto, the upper flange is surrounded endside by clamps formed out of the cover.

The movability is not impaired if the clamps arranged offset toward the outside with respect to the bumper supports surround the free end of the upper flange with spacing.

In one advantageous embodiment of the present invention, the upwardly disposed flange of the base body includes a step whose height is compensated by the hook-shaped bent-back forward end of the cover, which rests on the free upper end of the apron and terminates at a distance from the step.

Also a stronger deformation of the base body does not impair the cover if the latter is subdivided in the center longitudinal plane of the vehicle and a covering is provided covering the gap between the cover parts, which permits displacement movements of the cover parts.

Accordingly, it is an object of the present invention to provide a motor vehicle bumper which avoids by simple means the aforementioned shortcomings and drawbacks encountered in the prior art.

Another object of the present invention resides in a motor vehicle bumper which far-reachingly precludes damage of the cover on top of the upper flange of the base body in case of local impacts on the bumper outside of the location of the force introduction.

A further object of the present invention resides in a motor vehicle bumper which is simple in construction, yet assures maximum protection against permanent damage to any of its parts.

Still a further object of the present invention resides in a motor vehicle bumper in which all parts are far-reachingly protected against damage due to bending upon impingement against an obstacle.

These and other objects, features and advantages of the present invention will become more apparent from the following description when taken in connection with the accompanying drawing which shows, for purposes of illustration only, two embodiments in accordance with the present invention, and wherein:

FIG. 5 is a perspective view, partially broken away, through the center area of the bumper according to FIG. 4, on an enlarged scale.

Figure 1:
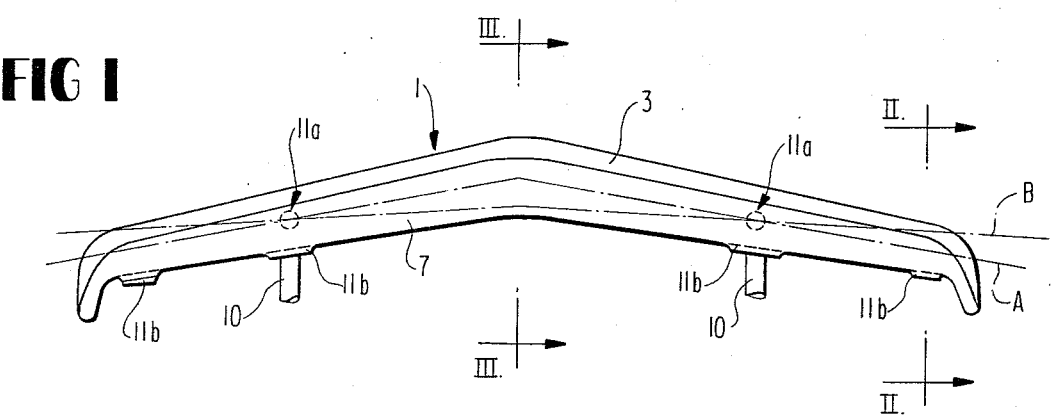
FIG. 1 is a somewhat schematic plan view on a bumper in accordance with the present invention provided with a one-piece cover member.

Referring now to the drawing wherein like reference numerals are used throughout the various views to designate like parts, a motor vehicle bumper generally designated by reference numeral 1 with an approximately U-shaped base body generally designated by reference numeral 2 which is relatively elastic and consists, for example, of a fiberglass reinforced synthetic plastic material, is provided with an apron 3 of elastic plastic material. The apron 3 thereby covers the forwardly disposed web 4 of the base member 2 and is drawn around up to the flanges 5 and 6 adjoining the web 4 on both sides, is secured thereat and may—as indicated in particular in FIGS. 2 and 3—extend further downwardly for the formation of a spoiler.

Figure 2:
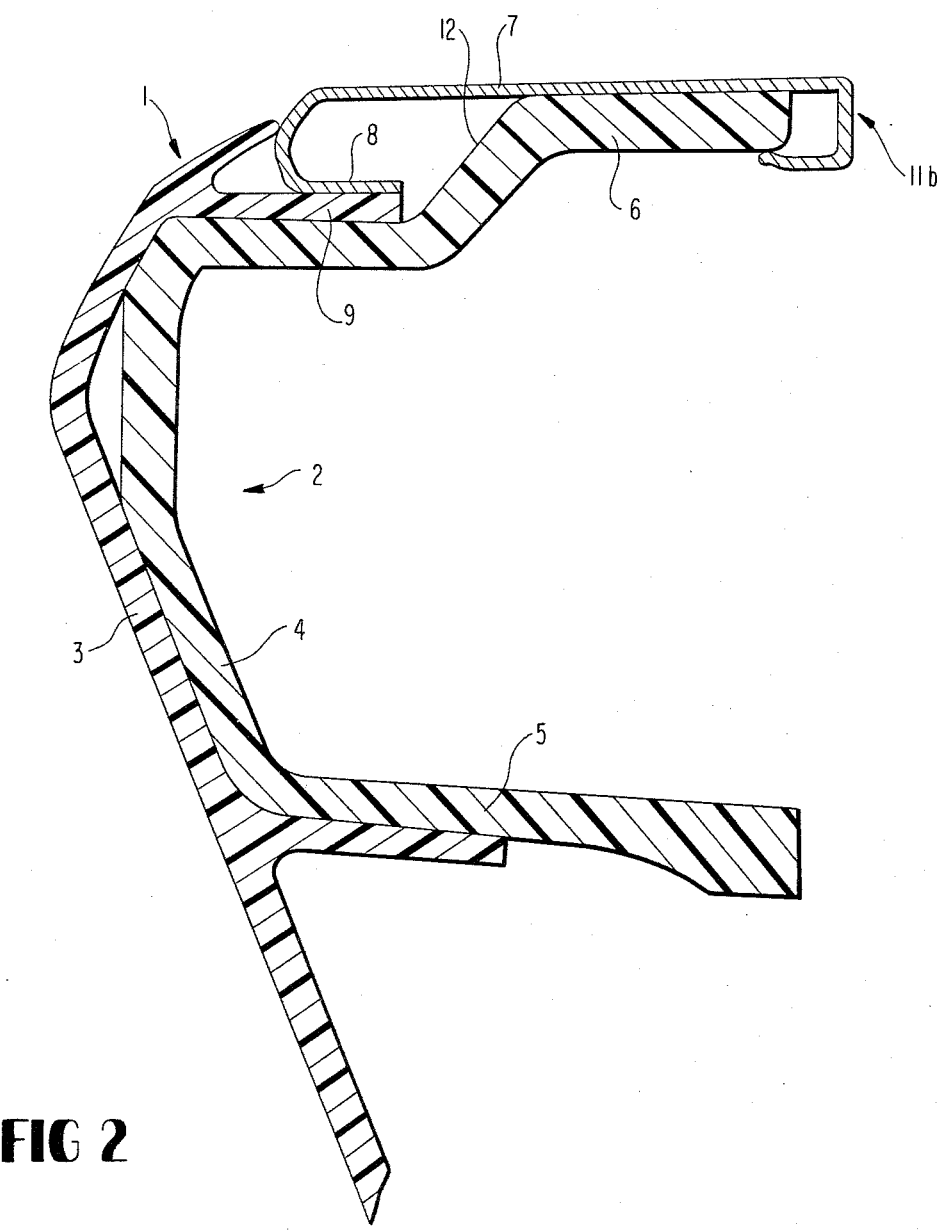
FIG. 2 is a cross-sectional view, on an enlarged scale, taken along line II—II of FIG. 1.
Figure 3:
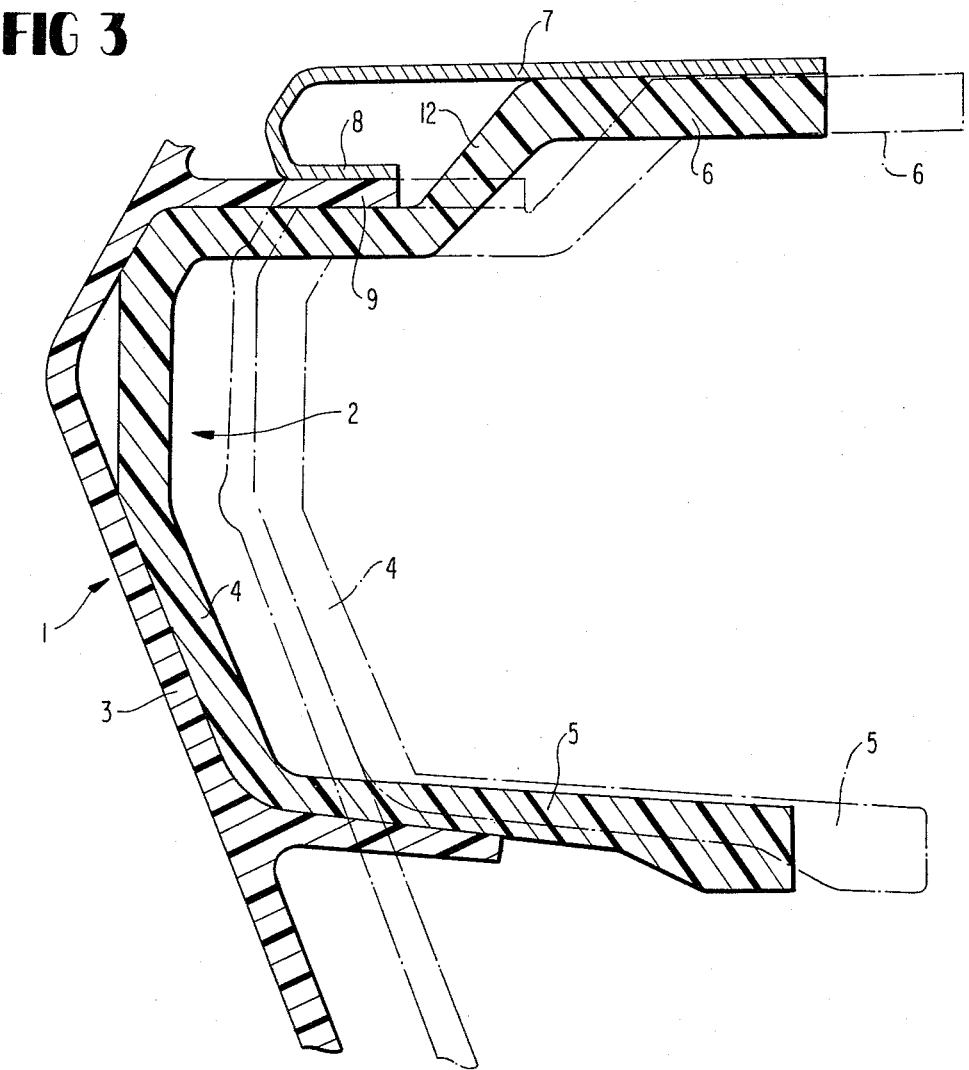
FIG. 3 is a cross-sectional view, on an enlarged scale, taken along line III—III of FIG. 1.
Figure 4:
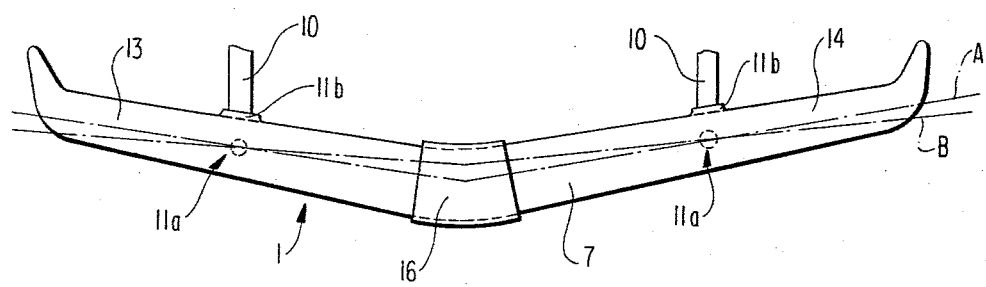
FIG. 4 is a somewhat schematic plan view on a second embodiment of a bumper in accordance with the present invention provided with a subdivided cover.

A cover 7 constructed as decorative strip covers the area of the upwardly disposed flange 6 not covered by the apron 3, whereby the cover 7 is bent back hook-shaped at its forward end 8 and rests on the upper free end 9 of the apron 3. The connection of the cover 7 with the base member 2 and with the apron 3 takes place exclusively by fastening elements generally designated by reference numeral 11a disposed in the axial direction of the two bumper supports 10 indicated schematically in FIGS. 1 and 4 as well as by clamps 11b formed out of the cover 7 within the area of the bumper supports 10 and/or offset toward the outside with respect thereto. The clamps 11b surround the upper flange 6 of the base member 2, whereby with the use of outwardly disposed clamps 11b a spacing is provided at the end face end of the flange 6 with respect to the web of the associated clamp 11b (FIG. 2). As shown in particular by FIG. 3, the base body 2 and the apron 3 can thus deform in case of a local, for example, central impingement of the motor vehicle bumper 1 against an obstacle, whereas the cover 7 retains its initial position. To indicate more clearly the movement which takes place in case of an impact, lines are indicated in FIGS. 1 and 4, whereby the line "A" represents the initial condition and the line "B" the bending line which will establish itself as the illustrated relative pivoting occurrs about the vertical axis of connections 11a. Since—as indicated—the end areas of the motor vehicle bumper 1 are subjected, starting from the bumper supports 10, to a forward displacement, the forward end 8 of the cover 7 has a corresponding spacing with respect to a step 12 of the upwardly disposed flange 6 so that an abutment of the forward end 8 is prevented.

In the embodiment according to FIGS. 4 and 5, the cover 7 is subdivided in the center longitudinal plane of a motor vehicle (not shown) so that cover parts 13 and 14 with a gap 15 disposed therebetween will result. The gap 15 is thereby so large that the two cover parts 13 and 14 do not contact one another up to the maximum through-bending of the base member 2. A covering 16 covering the gap 15, in addition to an improved appearance, serves thereby also for the guidance of the cover parts 13 and 14 in case of a deformation of the base body 2.

While we have shown and described only two embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A motor vehicle bumper, comprising relatively elastic base body means of approximately U-shaped cross section, apron means formed of elastic plastic material which covers a forwardly disposed web of the base body means and is drawn about up to flanges adjoining the web on both sides, and cover means constructed as decorative strip and covering at least the remaining visible part of an upwardly disposed one of said flanges, characterized in that the cover means is pivotally connected with the base body means by fastening means disposed substantially in the axial direction of two bumper support means in a manner permitting relative vertical axis pivoting movement therebetween, and in that within the area of the bumper support means, the upper flange is surrounded at the end face by clamp means formed out of the cover means.

2. A motor vehicle bumper according to claim 1, characterized in that the cover means is pivoted with the base body means substantially exclusively by said fastening means.

3. A motor vehicle bumper according to claim 2, characterized in that the upper flange is also surrounded at the end face by clamp means formed out of the cover means within areas offset outwardly with respect to the bumper support means.

4. A motor vehicle bumper according to claim 3, characterized in that the clamp means which are arranged offset outwardly with respect to the bumper support means, surround a free end of the upper flange with a spacing.

5. A motor vehicle bumper according to claim 4, characterized in that upwardly disposed flange of the base body means includes a step, whose height is compensated for by a hook-shaped bent-back forward end of the cover means which rests on the free upper end of the apron means and terminates at a distance from the step.

6. A motor vehicle bumper according to claim 5, characterized in that the cover means is subdivided in the center longitudinal plane of the vehicle, and a covering is provided covering a gap between the resulting cover parts, said covering permitting displacement movements of the cover parts.

7. A motor vehicle bumper according to claim 1, characterized in that the upper flange is also surrounded at the end face by clamp means formed out of the cover means within areas offset outwardly with respect to the bumper support means.

8. A motor vehicle bumper according to claim 7, characterized in that the clamp means which are arranged offset outwardly with respect to the bumper support means, surround a free end of the upper flange with a spacing.

9. A motor vehicle bumper according to claim 1 or 2, characterized in that the upwardly disposed flange of the base body means includes a step, whose height is compensated for by a hook-shaped bent-back forward end of the cover means which rests on the free upper end of the apron means and terminates at a distance from the step.

10. A motor vehicle bumper according to claim 1 or 2, characterized in that the cover means is subdivided in the center longitudinal plane of the vehicle, and a covering is provided covering the gap between the resulting cover parts, said covering permitting displacement movements of the cover parts.

11. A motor vehicle bumper, comprising:
    (a) relatively elastic base body means of approximately U-shaped cross section;
    (b) apron means formed of elastic plastic material and mounted upon said base body means so as to cover a forwardly disposed web of the base body means as well as portions of flanges adjoining said web on upper and lower sides thereof; and
    (c) cover means, constructed as a decorative strip, and mounted to said base body means in a manner covering at least substantially all portions of said upper flange besides the portion covered by said apron means and enabling relative longitudinal displacement between said cover means, and said base body and apron means, whereby damage to said cover means due to displacement caused by impacts upon said apron means covered portions of the body means is minimized.

12. A motor vehicle bumper according to claim 11, wherein said cover means is mounted to said base body means by fastening elements, each of said fastening elements being disposed substantially in axial alignment with a respective one of two supporting means for said bumper and in a manner enabling relative vertical axis pivoting between said cover means, and said base body and apron means.

* * * * *